United States Patent
Frank et al.

(10) Patent No.: US 7,905,557 B2
(45) Date of Patent: Mar. 15, 2011

(54) BRAKE-PRESSURE MODULATOR PILOT UNIT

(75) Inventors: Dieter Frank, Hannover (DE); Juan Rovira-Rifaterra, Garbsen (DE); Armin Sieker, Bielefeld (DE); Andreas Teichmann, Isernhagen HB (DE)

(73) Assignee: WABCO GmbH, Hannover (DE)

( * ) Notice: Subject to any disclaimer, the term of this patent is extended or adjusted under 35 U.S.C. 154(b) by 1091 days.

(21) Appl. No.: 11/658,066

(22) PCT Filed: Jul. 5, 2005

(86) PCT No.: PCT/EP2005/007226
§ 371 (c)(1),
(2), (4) Date: Jan. 19, 2007

(87) PCT Pub. No.: WO2006/007970
PCT Pub. Date: Jan. 26, 2006

(65) Prior Publication Data
US 2007/0236084 A1    Oct. 11, 2007

(30) Foreign Application Priority Data
Jul. 21, 2004   (DE) .......................... 10 2004 035 763

(51) Int. Cl.
*B60T 8/34* (2006.01)

(52) U.S. Cl. .................. 303/118.1; 303/119.2; 137/613; 137/614.14

(58) Field of Classification Search ............... 303/118.1, 303/119.1, 119.2, 40, 50, 3, 15; 137/613, 137/614.11, 614.13, 614.14
See application file for complete search history.

(56) References Cited

U.S. PATENT DOCUMENTS

| 3,989,063 | A |   | 11/1976 | Brouwers et al. |
|---|---|---|---|---|
| 4,655,255 | A |   | 4/1987 | Rode |
| 5,184,878 | A | * | 2/1993 | Woerner ................... 303/118.1 |
| 5,297,860 | A | * | 3/1994 | Nakamura ................. 303/113.2 |
| 5,450,876 | A | * | 9/1995 | Reinicke .................. 137/614.19 |
| 6,453,936 | B1 |   | 9/2002 | Frank et al. |
| 6,467,854 | B2 | * | 10/2002 | Frank et al. ................ 303/118.1 |
| 6,626,505 | B2 | * | 9/2003 | Frank et al. ..................... 303/15 |
| 2002/0135451 | A1 |   | 9/2002 | Frank et al. |

FOREIGN PATENT DOCUMENTS

| DE | 24 03770 A | 8/1975 |
|---|---|---|
| DE | 35 01 708 A1 | 7/1986 |
| DE | 42 27 084 A1 | 2/1994 |
| DE | 100 09 116 A1 | 8/2001 |
| DE | 101 13 316 A1 | 9/2002 |
| WO | WO 03053758 A | 7/2003 |

\* cited by examiner

*Primary Examiner* — Robert A Siconolfi
*Assistant Examiner* — Mariano Sy
(74) *Attorney, Agent, or Firm* — Kramer Levin Naftalis & Frankel LLP

(57) ABSTRACT

A valve control unit including three valve units for two brake channels of an electropneumatic brake system is provided. Each valve unit is embodied as a valve modulator device for a braking pressure control circuit including an air inlet valve with a primary solenoid and a bleed valve with a secondary solenoid. Each modulator device armature includes a common solenoid guide arrangement controlled by the magnetic flux of a common magnetic coil. Independent operation of the armatures is achieved whereby flux through the secondary solenoid is weakened by a shunt in the flux circuit which causes a switching delay for the secondary solenoid relative to the primary solenoid. The magnetic resistance of a non-magnetic disc effects switch-off acceleration in the flux circuit with energized secondary solenoid, weakens the field and causes the secondary solenoid to revert to a spring-loaded base state at a higher flux than the primary solenoid.

9 Claims, 16 Drawing Sheets

Redundancy Operation

EBS Operation, Air Admission

EBS Operation, Pressure Holding

EBS Operation, Venting

ABS Operation, Venting

ABS Operation, Pressure Holding

ABS Operation, Air Admission

General

Normal Condition

Primary Armature Switched

Primary Armature and Secondary Armature Switched

BRAKE-PRESSURE MODULATOR PILOT UNIT

BACKGROUND OF THE INVENTION

The present invention relates to an improved valve pilot-control unit for a brake-pressure modulator.

DE 100 09 116 A1 (hereinafter, "D1") describes a known valve device for the pilot-control unit of a brake-pressure modulator for an electronic air-brake system (EBS). As shown in FIG. 2 of D1, the pneumatic circuit for the pilot-control unit of a brake-regulating loop of the brake-pressure modulator comprises a 3/2 solenoid valve (21) as a redundancy valve, a normally open 2/2 solenoid valve (22) as an air-admission valve and a normally open 2/2 solenoid valve (23) as a vent valve. As described in DE 42 27 084 A1 (see FIG. 2 therein), the redundancy valve in such circuit can also be used commonly for a second brake-regulating loop. According to this circuit layout, therefore, the pilot-control unit for two brake-regulating loops comprises one 3/2 redundancy valve for both loops and separate 2/2 vent valves and 2/2 air-admission valves for each individual loop. A total of 5 solenoids is provided for actuating the respective armatures of these 5 solenoid valves.

FIG. 4 of D1 shows that the solenoid valves according to FIG. 2 can be constructed with only one sealing seat forming a hermetic seal, at which, while the solenoid is deenergized, an elastomeric insert (41) provided in the corresponding armature (39) is urged by the action of the solenoid restoring spring (40) against a first stroke limiter having a valve-sealing seat (31) (47 for valve 21 of 3/2 type, 43 for valve 23 of 2/2 type, no sealing seat corresponding to 45 for valve 22 of 2/2 type). Besides this sealing seat, the solenoid valves have a second position in which the corresponding armature (39) is urged by the action of the magnetic force against a second stroke limiter (34) at which there is formed a detail metal valve seat (48 for valve 21 of 3/2 type, 46 for valve 22 of 2/2 type, no sealing seat corresponding to 44 for valve 23 of 2/2 type), which does not seal the unavoidable leaks hermetically but, because of the selected switching system, has no significance for the operation of the brake-pressure modulator.

DE-OS 24 03 770 discloses, for a hydraulic ABS solenoid valve, measures for influencing the magnetic forces, in order to obtain three stable and reproducible armature positions as a function of the magnet current, namely, positions for the deenergized condition, the condition for an "exciter stage 1" and the condition for a "full exciter stage". In the deenergized starting position of the solenoid valve, outlet valve (12/27) is closed and inlet valve (11/28) is open; as a result, pressure source (3) is in communication with brake cylinder (2) and pressurization takes place in the brake cylinder. During energization corresponding to exciter stage 1, armature (13) travels a short distance and closes inlet valve (11/28), thus holding the pressure in brake cylinder (2). During energization corresponding to the full exciter stage, armature (13) is pushed up to spacer ring (16), outlet valve (12/27) opens and brake cylinder (2) is depressurized.

WO 03/053758 (hereinafter, "D2") describes a brake-pressure modulator for a trailer vehicle, wherein a pilot-control unit containing four valves in the form of one 3/2 "reservoir/venting" selection valve (110), one 3/2 redundancy valve (109) and two 2/2 modulator valves (106/107) is used for two different brake-regulating loops. Therefore, the number of valves, and thus also the number of valve magnets, for two brake-regulating loops is reduced to four. However, the pilot-control circuit according to D2 suffers from the disadvantage that it is not possible at any given instant to admit air via one of the two ducts while venting via the other. Instead, at all times, it is only possible to admit air or vent via both ducts simultaneously. Consequently, it is not possible to raise the pressure in one duct and simultaneously lower the pressure in the other duct, as would be highly advantageous for a flexible regulation strategy. A further disadvantage of this solution lies in the series connection of the valves, meaning that the achievable air flow is diminished and the effective nominal width of the pilot-control unit is reduced.

DE 35 01 708 A1 describes an electromagnetically actuatable multi-way valve in which two different valves, one of which is an inlet valve (9, 10) that can be actuated via a first armature (5) and the other of which is an outlet valve (23, 25) that can be actuated via a second armature (21), can be loaded by only one common coil (2). Armatures (5) and (21) are biased with restoring springs of different dimensions, one a weakly dimensioned restoring spring (13) for armature (5) and the other a strongly dimensioned restoring spring (17) for armature (21), so that they can be actuated independently of one another by controlling the current in coil (2). This valve can therefore also be used as a combined air-admission/vent valve in a brake-pressure modulator. As explained below, however, the principle of different design of the restoring springs (13, 17) that underlies this valve for independent actuation leads to difficulties in valve design. The "weak" restoring spring must be able to overcome the gas force acting at inlet (9, 10) and it must therefore be strong enough that the restoring function for inlet valve (9, 10) is assured if the current fails. "Strong" restoring spring (17) must be strong enough that outlet valve (23, 25) is activated only at much higher magnet current than is the case for inlet valve (9, 10). The strong design of restoring spring (17) is therefore also limited by the force that the magnet can actually provide. To implement this principle, therefore, it is also necessary to provide a relatively large magnet with the necessary magnetic force. Besides causing higher manufacturing costs, such a magnet must be supplied with greater electrical power, which nevertheless does not lead to a satisfactorily short valve switching time, because of the increase of inertia related to structural size. In addition the choice of larger structural units works against the goal of producing compact devices.

SUMMARY OF THE INVENTION

Generally speaking, in accordance with the present invention, an improved valve control unit is provided wherein two different brake-regulating ducts can be actuated independently of one another during application of the valve-control unit as a brake-regulating pilot-control unit. The inventive valve control unit overcomes disadvantages associated with conventional valve control units, and offers a compact design that is less costly to manufacture. The inventive valve control unit additionally has the advantage of drawing low current, also resulting in the advantage of favorable heating behavior in the device. A further advantage of the invention is the reduced complexity of contacting and of electrical activation (number of needed end stages as well as associated components).

Still other objects and advantages of the present invention will in part be obvious and will in part be apparent from the specification.

The present invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

The present invention will be described in greater detail hereinafter on the basis of the accompanying drawings, wherein.

DETAILED DESCRIPTION OF THE PREFERRED EMBODIMENTS

Figure 1:
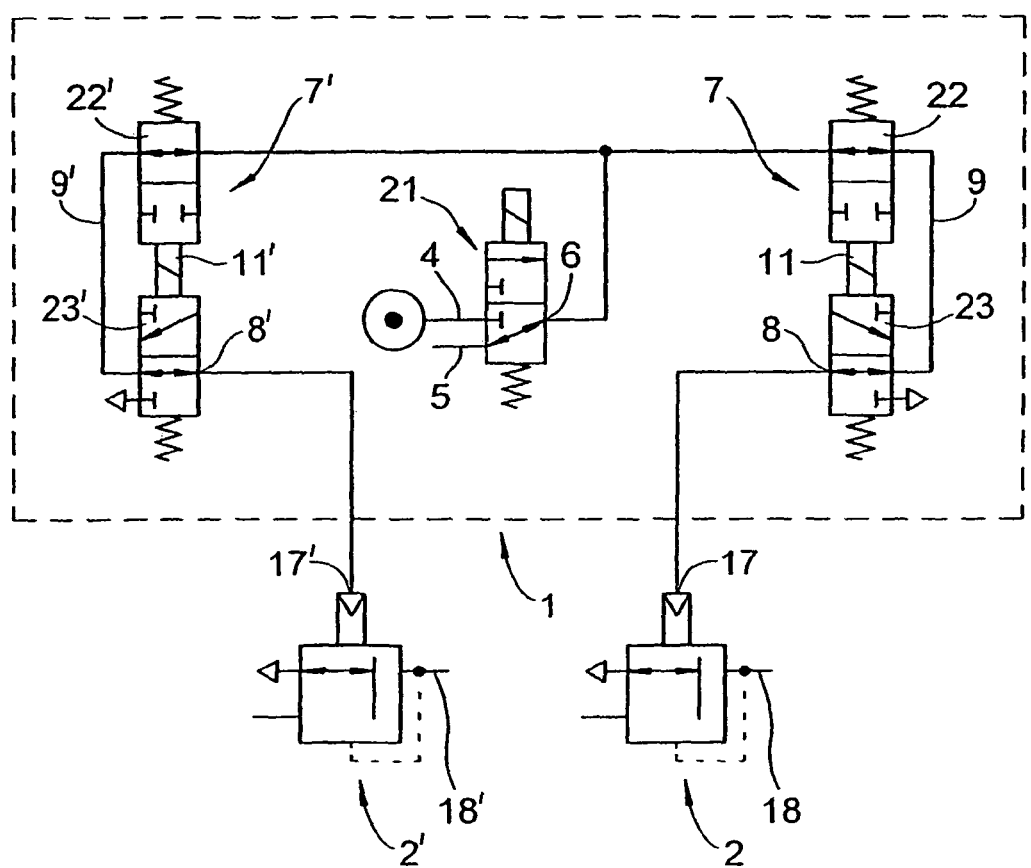
FIG. 1 is a pneumatic circuit diagram depicting a valve control device according to one embodiment of the present invention having application as a pilot-control unit for an electronic air-brake system (EBS) and capable of making a pilot-control pressure available for two pressure-regulating loops.

Referring now to the drawings where (non-ferromagnetic) parts that are not magnetically conductive are illustrated with cross hatching, so that they can be readily distinguished from singly-hatched magnetic parts, and wherein reference numerals 1, 2, 4, 5, 6, 17, 18, 21, 22 and 23 are adopted from D2 for identification of devices having like effects, FIG. 1 shows a pneumatic valve control device (1) according to one embodiment of the present invention, which in particular is used as a pilot-control unit for an electronic air-brake system. Valve control device (1) is capable of making a pilot-control pressure available for two different brake-pressure-regulating loops, designated hereinafter as the first and second brake-pressure-regulating loops.

In this pilot-control unit, a 3/2 solenoid valve (21) with two inputs (4, 5) and one output (6) is used as the redundancy valve, while a first valve-modulator device (7) is used for the first brake-pressure-regulating loop and a second valve-modulator device (7') is used for the second brake-pressure-regulating loop. In 3/2 solenoid valve (21) constructed as a redundancy valve, a supply pressure is applied at first input (4) and a redundancy pressure is applied at second input (5). As is standard in EBS systems, this redundancy pressure is generated by exclusively mechano-pneumatic means; if the pilot-control unit is used in a truck, the redundancy pressure is delivered by the operator-actuated truck brake valve, while if the pilot-control unit is used in a trailer vehicle, the redundancy pressure generated in the truck is transmitted to the trailer via the brake-pressure line (brake hose).

At least during application for EBS operation, one pneumatic output (8) of first valve-modulator device (7) is in communication with an input (17) of an air-flow-intensifying relay valve (2) for the first brake-pressure-regulating loop; in the same way, one pneumatic output (8') of second valve-modulator device (7') is in communication with an air-flow-intensifying relay valve (2') for the second brake-pressure-regulating loop. The outputs (18, 18') of relay valves (2, 2') represent the fully-developed brake pressures for the first and second brake-pressure-regulating loops respectively.

Because of the cost-effective construction of valve-modulator devices (7, 7') explained hereinafter, pilot-control unit (1) can also be used advantageously for applications other than EBS regulation; for example, it can also be used in its basic design as an air-admission/venting device for the left and right air suspension springs of an electronically controlled air suspension system (ECAS). Hereinafter, therefore, the advantageous properties of pilot-control unit (1) will also be described as regards their general applicability.

According to FIG. 1, output (6) of 3/2 solenoid valve (21) is in pneumatic communication both with first valve-modulator device (7) for the first pressure-regulating loop and with second valve-modulator device (7') for the second pressure-regulating loop. Second valve-modulator device (7') is constructed identically to first valve-modulator device (7), and so it will be sufficient to explain its design hereinafter on the basis of first valve-modulator device (7), and with reference to drawing FIGS. 9 to 14.

Each valve-modulator device (7, 7') includes a first normally open 2/2 solenoid valve (22, 22') as an air-admission valve and a second normally closed 2/2 solenoid valve (23, 23') as a vent valve. These valves are in communication with one another via an internal connection (9, 9').

Figure 10:
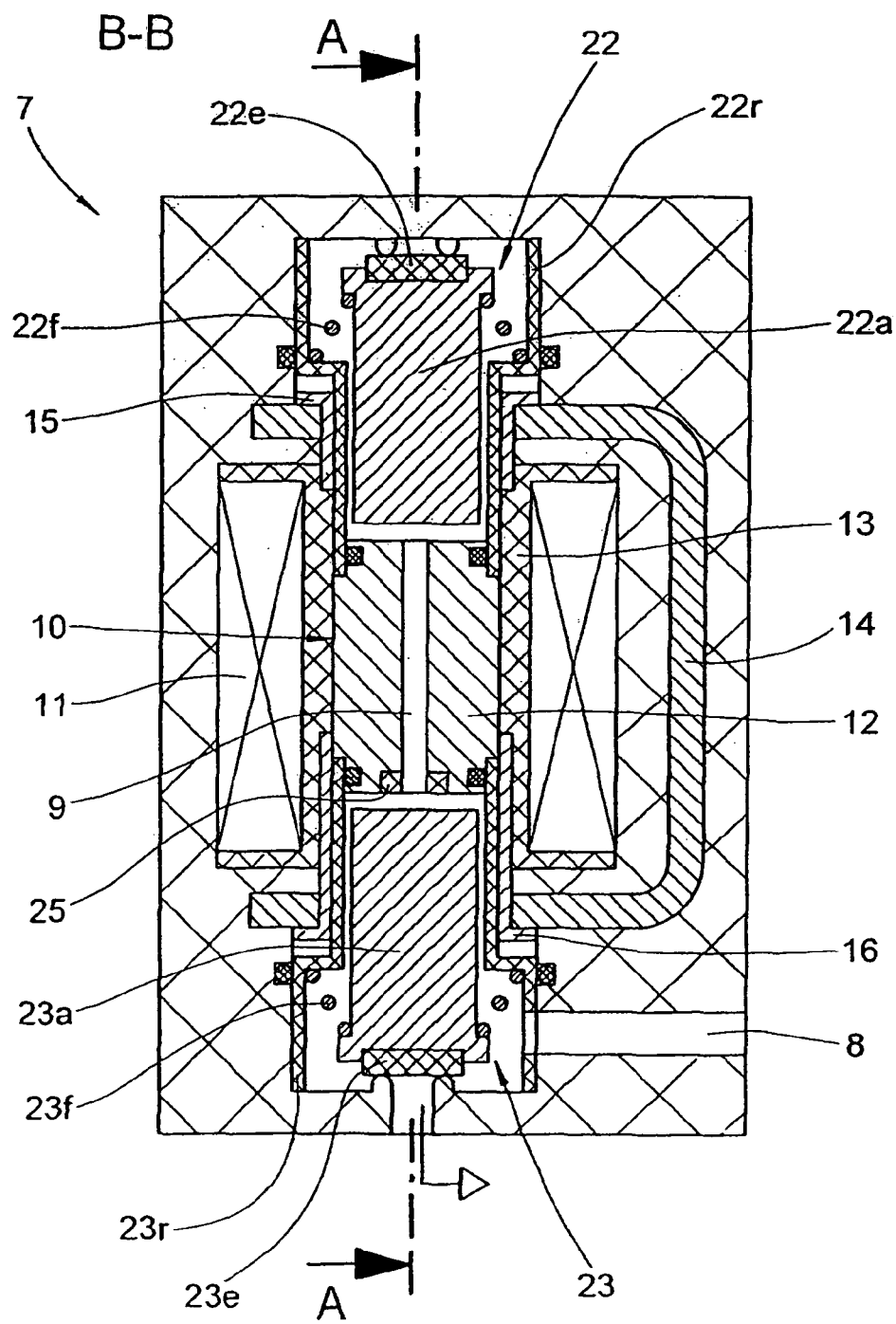
FIG. 10 is an individual sectional diagram of the embodiment of the valve-modulator device depicted in FIG. 9 taken along line B-B in FIG. 9.

As shown in FIG. 10, armatures disposed in a common armature-guide arrangement (10) for valve-modulator device (7) and loaded with respective springs (22f, 23f) are provided in the form of a primary armature (22a) and a secondary armature (23a) for first 2/2 solenoid valve (22) and second 2/2 solenoid valve (23) respectively. Each armature is actuated by a common solenoid (11) provided for both solenoid valves, and at least secondary armature (23a) is equipped with an elastomeric insert (23e). In the embodiment depicted in FIG. 10, primary armature (22a) is also equipped with an elastomeric insert (22e). Primary armature (22a) is intended as a switching element for air-admission valve (22), and secondary armature (23a) is intended as a switching element for vent valve (23).

While solenoid (11) is de-energized, both primary armature (22a) of air-admission valve (22) and secondary armature (23a) of vent valve (23) are in their normal positions defined by spring loading (22f and 23f respectively).

If a magnet current I is injected into solenoid (11) by application of a voltage or current source, a magnetic force acts on both armatures as a function of the magnetic flux $\Phi$ flowing through the two armatures as a result of the magnetomotive force:

$$\theta = w \cdot I$$

(where w is the number of turns).

If the magnet current flowing through solenoid (11) reaches a first magnet current of defined magnitude I₁, primary armature (22a) of air-admission valve (22) is displaced into its switched position determined by the magnetic force, whereas secondary armature (23a) of vent valve (23) still remains in spring-loaded normal condition.

If the magnet current I flowing through solenoid (11) reaches a second magnet current of defined magnitude I₂, which is greater than the first magnet current I₁ by a defined amount, both primary armature (22a) of air-admission valve (22) and secondary armature (23a) of vent valve (23) are displaced into their switched positions determined by the magnetic force.

FIGS. 2 to 8 show the switched conditions of the valves involved in the preferred application of the valve control unit as an EBS pilot-control unit. For clarity, only the functional elements for the first brake-pressure-regulating loop are illustrated, and the solenoids are omitted.

Figure 2:
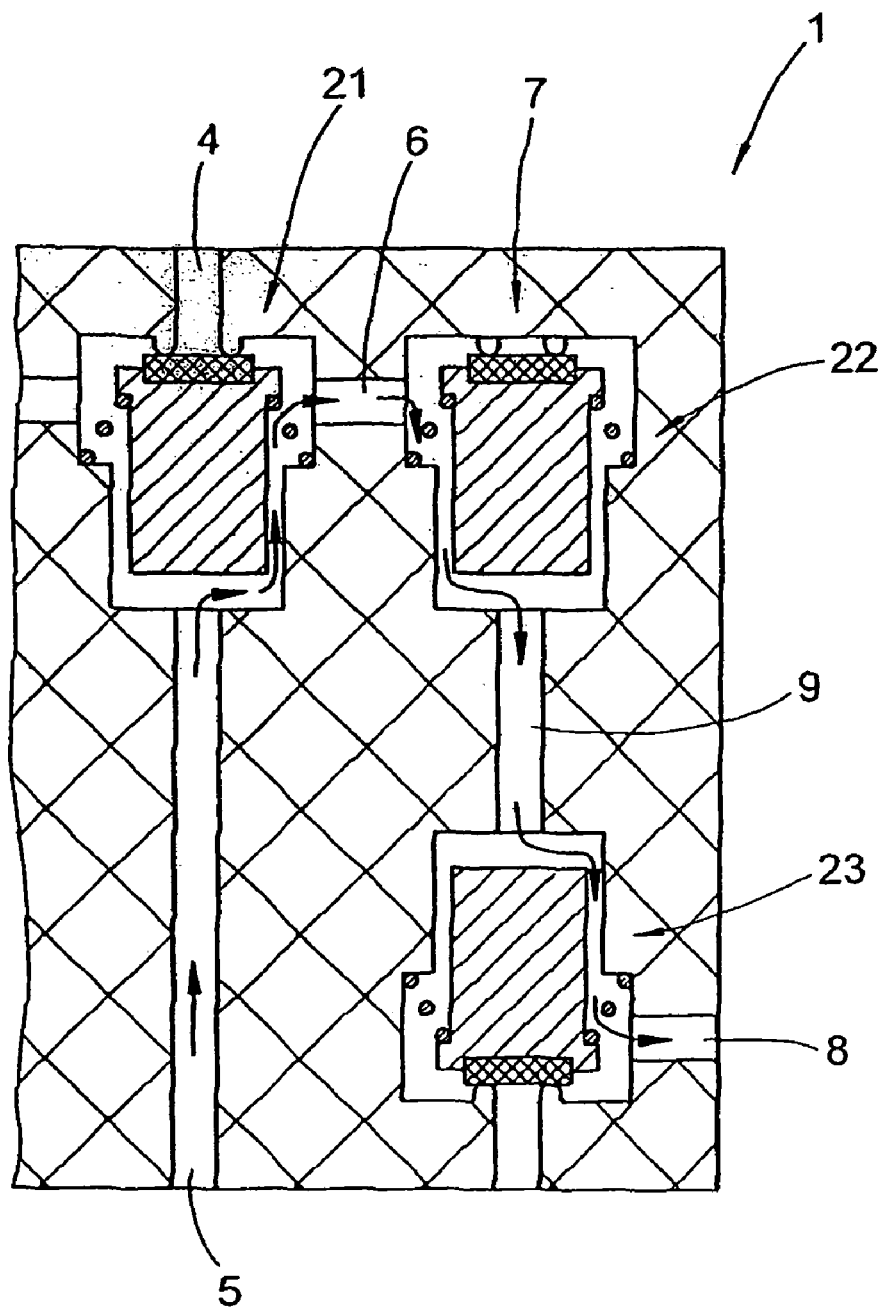
FIGS. 2 to 8 are diagrams depicting various switched conditions of the valves involved in application of the embodiment of the inventive valve control device as an EBS pilot-control unit.

In the redundancy operation according to FIG. 2, 3/2 solenoid valve (21), first normally open 2/2 solenoid valve (22) and second normally closed 2/2 solenoid valve (23) are in their spring-loaded normal positions, and, so, the redundancy pressure present at first pneumatic input (5) of 3/2 solenoid valve (21) is transmitted to output (8) of valve-modulator device (7).

Figure 3:
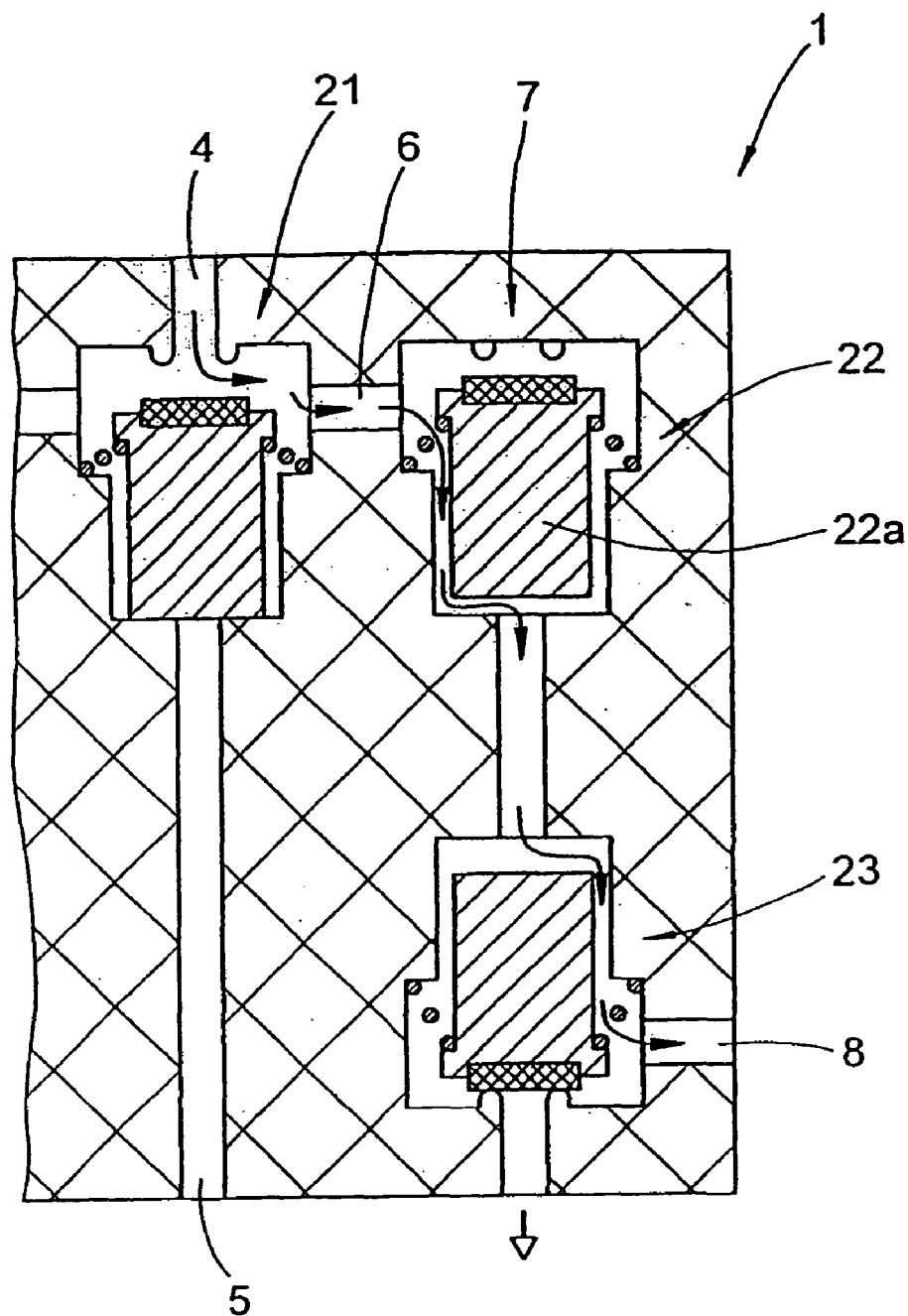

FIG. 3 shows air admission in EBS operation. During EBS operation, 3/2 solenoid valve (21) is in switched condition, so that the supply pressure present at second pneumatic input (4) is active. Second 2/2 solenoid valve (23) remains in its closed normal position, and first 2/2 solenoid valve (22) is opened. Armature (22a) in its illustrated intermediate position indicates the usual "pulsing" during air-admission operation.

Figure 4:
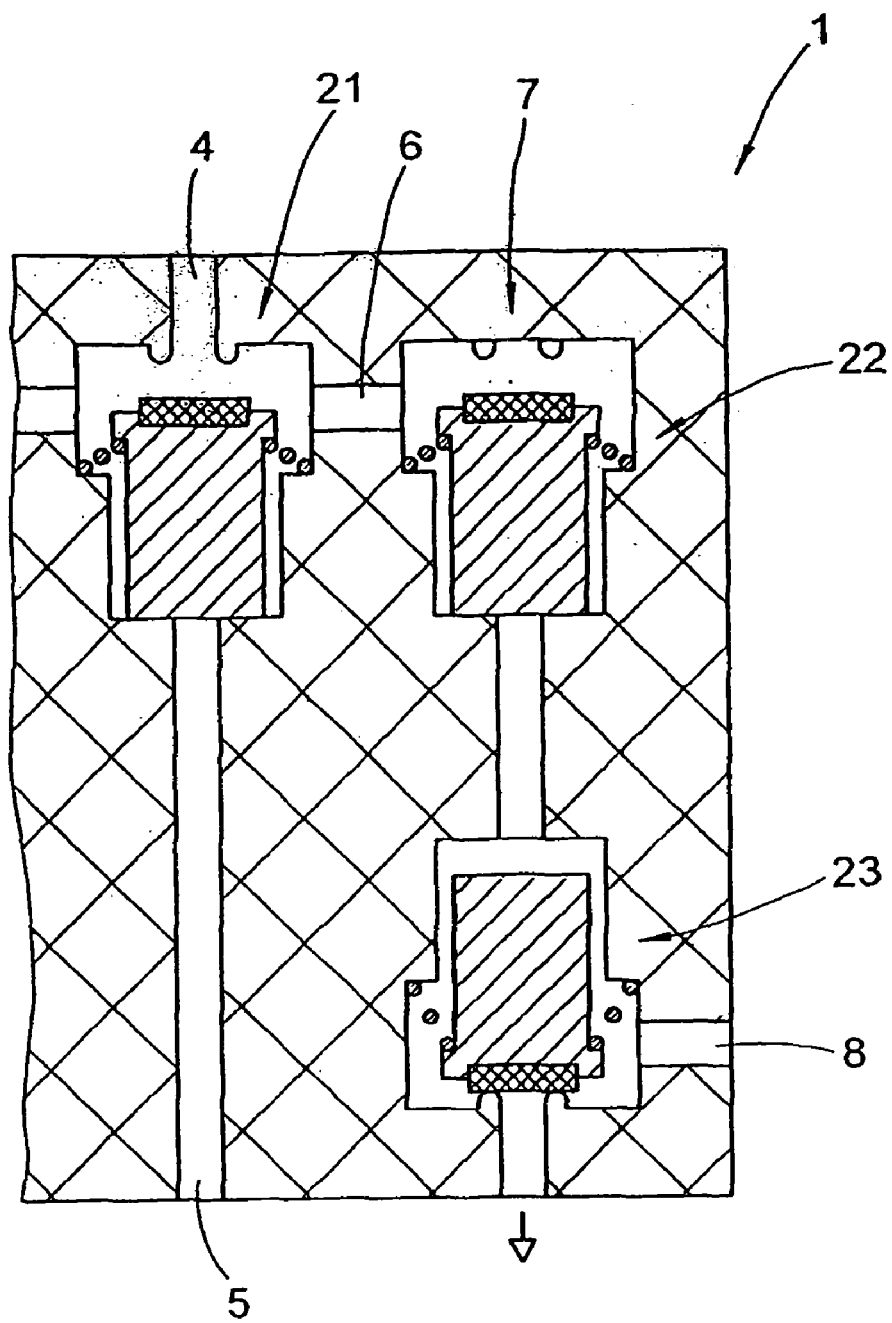

If a fully-developed pressure is to be held in EBS operation, first 2/2 solenoid valve (22) moves from the switched position, shown in FIG. 3, to closed position (metal-to-metal sealing seat), shown in FIG. 4. Thus, an effect of the pressure present at output (8) is no longer exerted via pilot-control unit (1).

Figure 5:
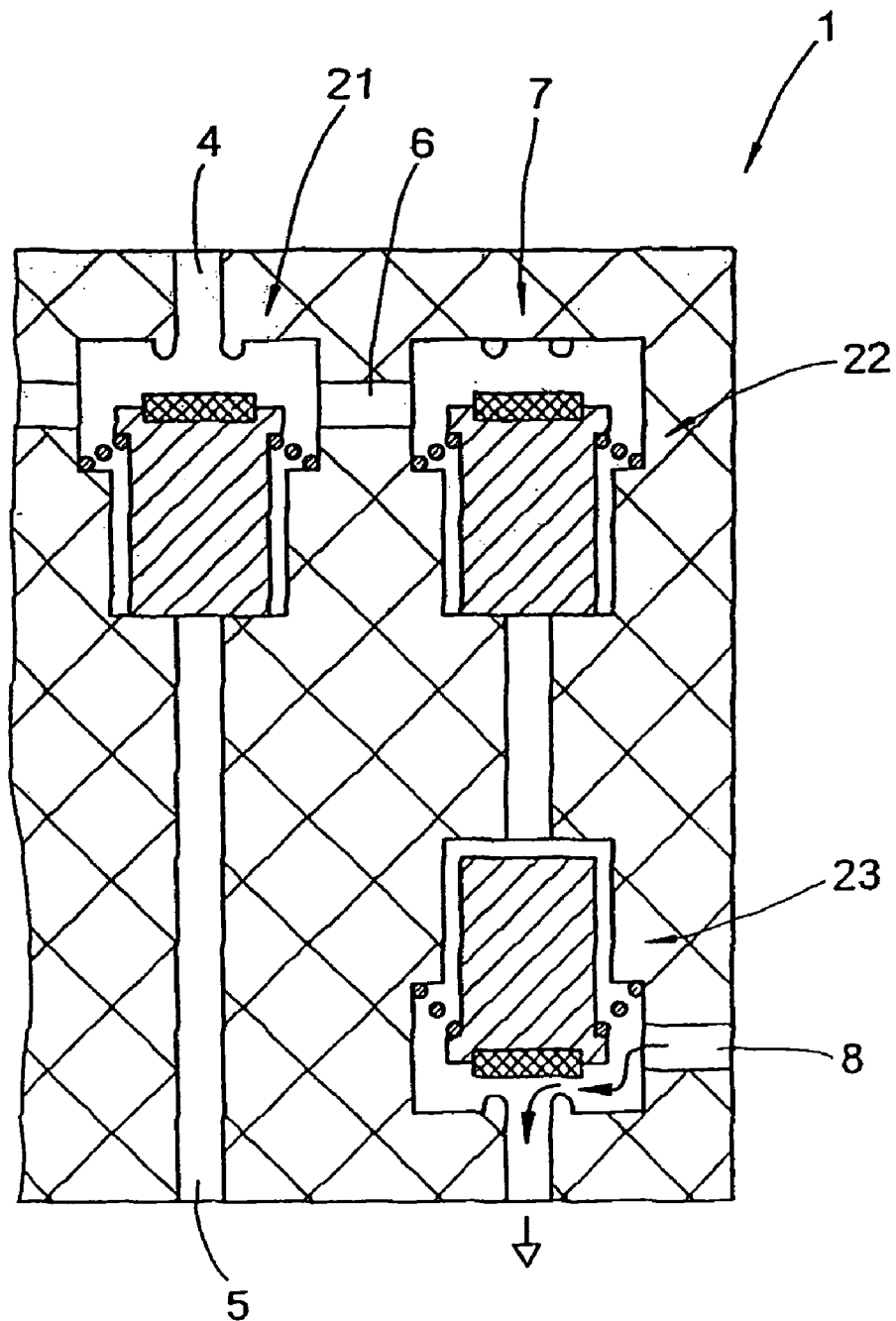

For venting in EBS operation, 2/2 solenoid valve (23) is moved from the switched position, shown in FIG. 4, to open position, shown in FIG. 5, usually, also in pulsed manner.

Figure 6:
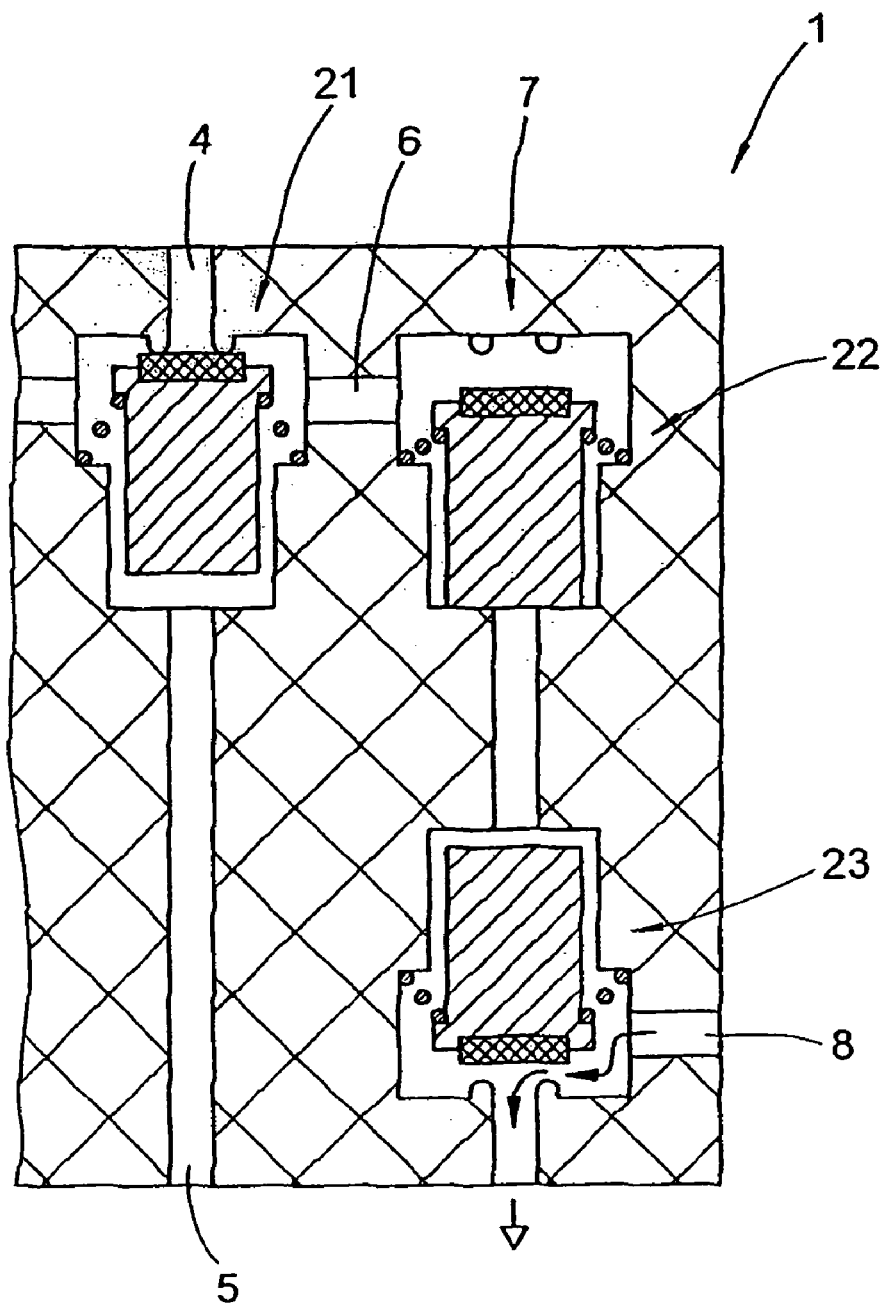
Figure 7:
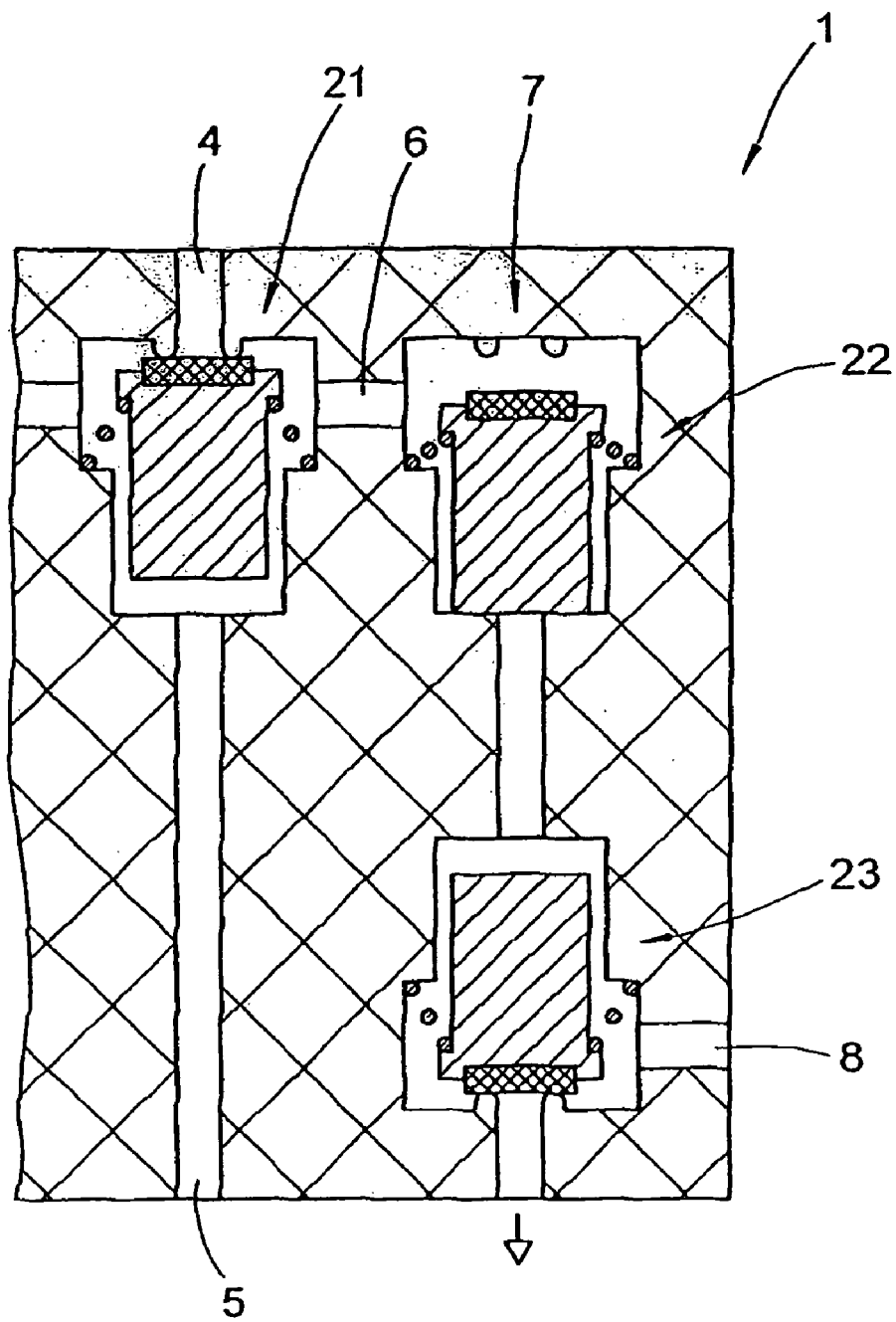
Figure 8:
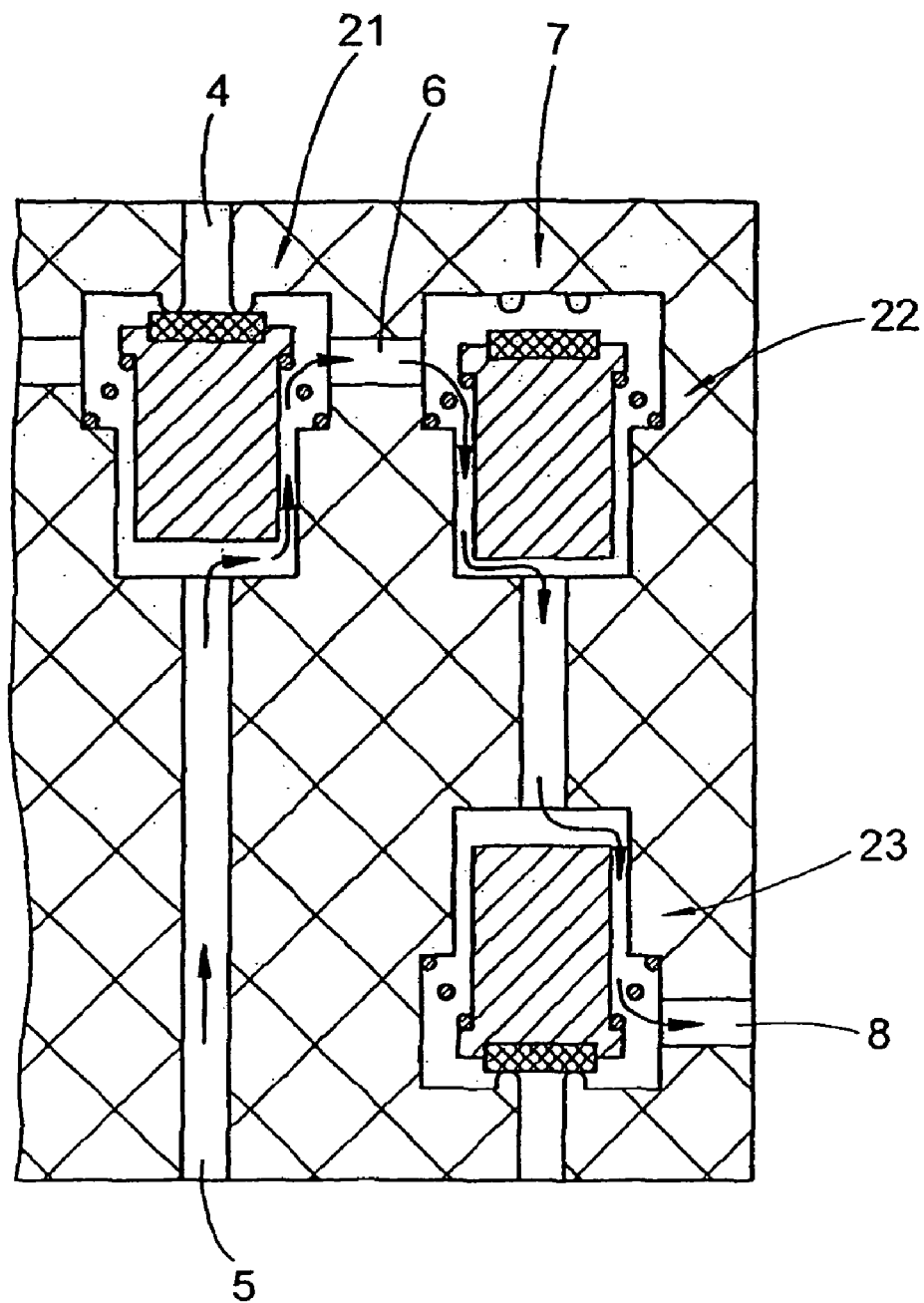

For completeness, the valve positions for pure ABS operation are illustrated in FIGS. 6 to 8. In ABS operation, the driver's intent, which is represented by the redundancy pressure, is active, and, so, 3/2 solenoid valve (21) remains in its spring-loaded normal condition. ABS venting according to FIG. 6 therefore corresponds to EBS venting according to FIG. 5 with switched 3/2 solenoid valve (21). ABS pressure holding according to FIG. 7 corresponds to EBS pressure holding according to FIG. 4 with switched 3/2 solenoid valve (21). And ABS air admission according to FIG. 8 corresponds to EBS pressure holding according to FIG. 3 with switched 3/2 solenoid valve (21).

The construction of valve-modulator device (7) will be discussed hereinafter with reference to FIG. 10, which shows a section B-B corresponding to the section direction indicated in FIG. 9.

A solenoid holder (13) for common solenoid (11) is disposed on common armature-guide arrangement (10). A U-shaped magnet yoke (14) is provided for generation of a strong magnetic field.

On common armature-guide arrangement (10) there is provided, in the region of primary armature (22a), a magnetic-field-concentrating yoke bush (15) of ferromagnetic material. The yoke bush (15) extends over a certain length region on an armature-guide tube (22r) provided for the primary armature (22a).

A magnetic-field-concentrating yoke bush (16) is also provided for secondary armature (23a). Yoke bush (16), as shown in FIG. 10, extends over a greater length region on armature-guide tube (23r) provided for secondary armature (23a) than the length region of yoke bush (15) of primary armature (22a).

In accordance with the present invention, yoke bush (16) of secondary armature (23a), which is longer than yoke bush (15) of primary armature (22a), establishes a magnetic shunt connected in parallel with secondary armature (23a), as explained in greater detail hereinafter.

To complete the magnetic loop, there is provided a magnet core (12), which is disposed immovably between air-admitting 2/2 solenoid valve (22) and venting 2/2 solenoid valve (23), and in which internal connection (9) has the form of a bore. A nonmagnetic disk (25) of nonmagnetic material is provided in magnet core (12) at the end thereof directed toward 2/2 solenoid valve (23).

In FIG. 10 there is also shown a plurality of O-rings, which will not be identified in further detail, and which are used for mutually sealing pressure spaces in valve-modulator device (7).

Figure 9:
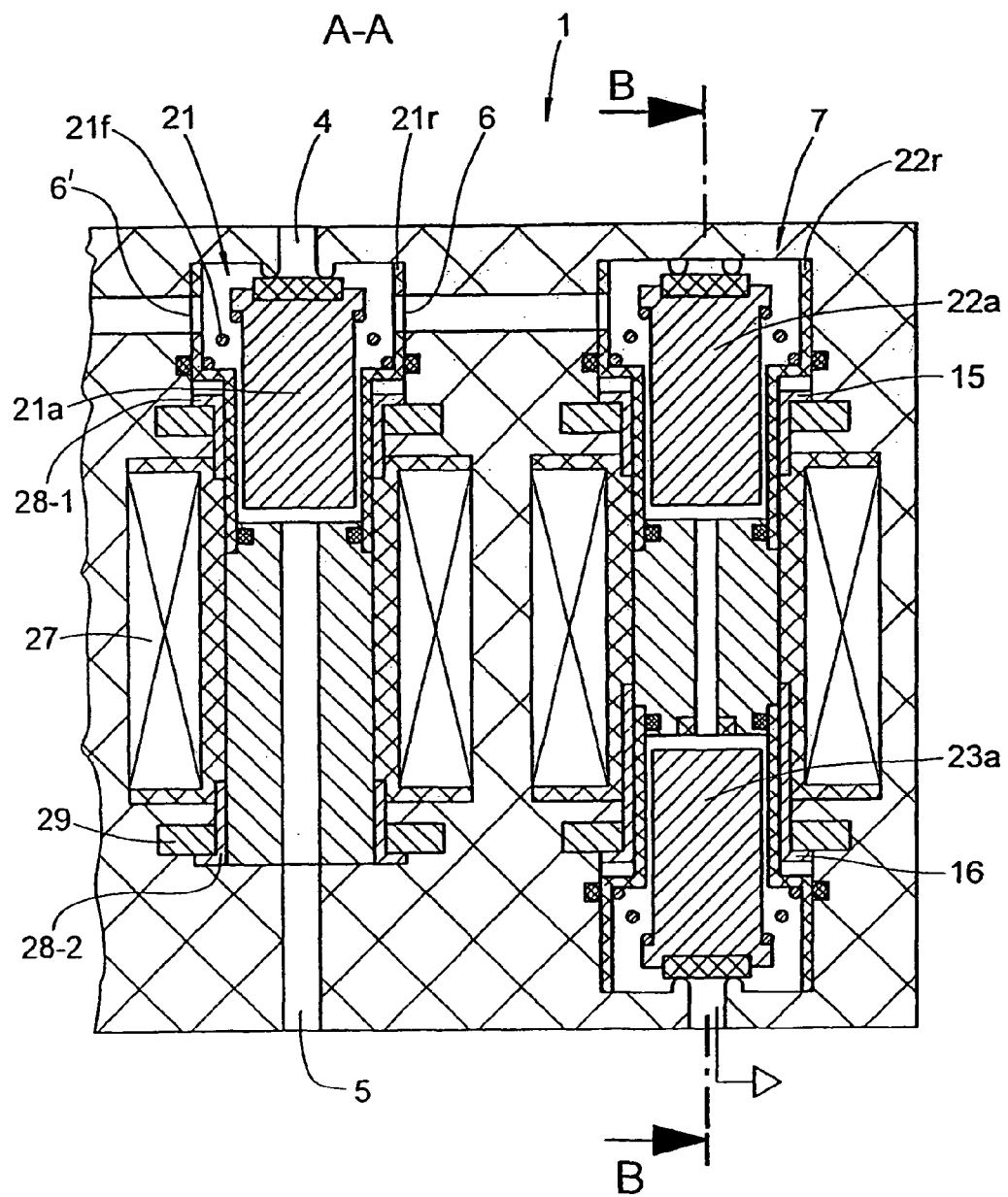
FIG. 9 is a combined sectional diagram of a valve-modulator device in accordance with an embodiment of the present invention including one air-admission valve and one vent valve with one solenoid for both valves and a 3/2 redundancy valve taken along line A-A in FIGS. 10, 12, 13 and 14.

The construction of pilot-control unit (1) with 3/2 solenoid valve (21) and valve-modulator device (7) is shown in FIG. 9 as section A-A, which corresponds to the section direction shown in FIG. 10. As depicted in FIG. 9, armatures (21a, 22a, 23a) are identical, and this represents a preferred embodiment.

By analogy to DE 101 13 316 A1, these identical armatures (21a, 22a, 23a) are advantageously constructed as small armatures with an approximate weight of only about 6 g. The metal body of each armature is completely coated with PTFE plastic and the elastomeric sealing element is attached by simplified vulcanization without coupling agent, although this sealing element is joined interlockingly to the metal body by an undercut.

Similarly, it is also advantageous to construct common solenoid (11) of valve-modulator device (7) such that it is identical to solenoid (27) of 3/2 solenoid valve (21).

A comparison of the two valve units (21, 7) reveals the different configurations of the yoke bushes. Yoke bush (28-1), disposed on armature-guide tube (21r) of 3/2 solenoid valve (21), is constructed such that it is equal in length to yoke bush (15) on armature-guide tube (22a). Yoke bush (28-2), as the counterpart at the lower end of U-shaped magnet yoke (29) of 3/2 solenoid valve (21), is identical in length to yoke bush (28-1). Compared with magnet yoke (28-2), however, as explained above, yoke bush (16) at the lower end of U-shaped magnet yoke (14) of valve-modulator device (7), as the counterpart for yoke bush (15) disposed on armature-guide tube (22r), is of considerably longer construction.

In implementing the magnetic shunt for secondary armature (23a) according to FIG. 10, armature-guide tube (23r) provided for this armature is made of nonmagnetic material such as, for example, non-rusting steel, as indeed are the other armature tubes (22r and 21r).

Figure 11:
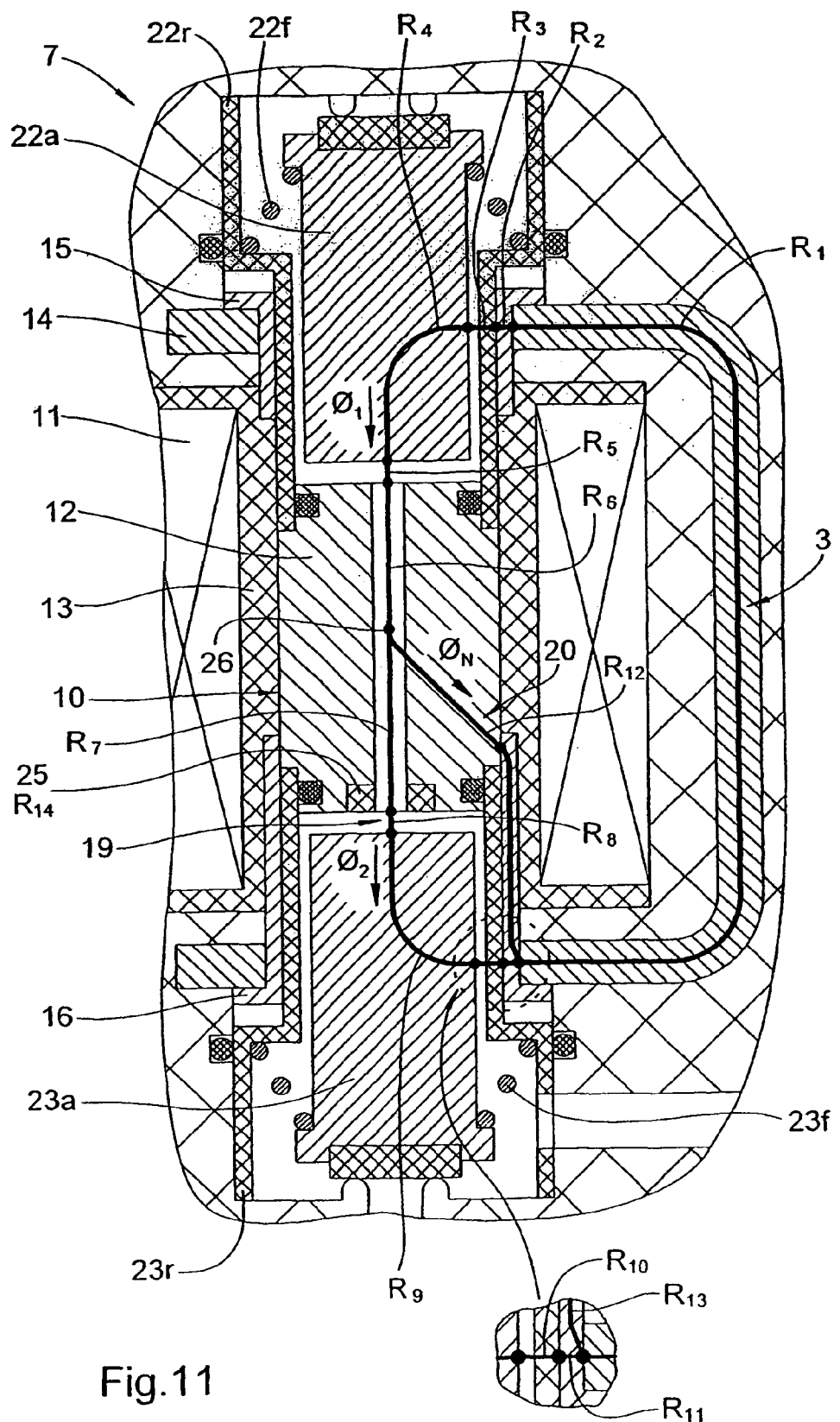
FIG. 11 illustrates the effect of a magnetic shunt in the embodiment of the valve-modulator device depicted in FIG. 10.

As illustrated in FIG. 11, a magnetic flux $\Phi_1$ is generated in primary armature (22a) of valve-modulator device (7) by the magnetomotive force θ, which is generated on the basis of the current I flowing through solenoid (11) A component $\Phi_N$ of this flux is branched off by a magnetic shunt of secondary armature (23a), so that in this armature there is active a flux $\Phi_2$ that is smaller than $\Phi_1$ by shunt component $\Phi_N$:

$$\Phi_2 = \Phi_1 - \Phi_N \quad [1]$$

For switching to occur, the magnetic-force-determining flux I is controlling for primary armature (22a) and flux $\Phi_2$ is controlling for secondary armature (23a) An armature (22a, 23a) changes over from its respective normal condition to its switched condition whenever the magnetic force acting on it exceeds the force of its restoring spring (22f, 23f).

For explanation of the magnetic shunt, the three-dimensional magnetic field in FIG. 11 is illustrated in simplified and schematic form as a magnetic-flux loop (3), comprising, firstly, a main path (19), namely the path for the flux $\Phi_2$ that is active in secondary armature (23a), and, secondly, a shunt path (20), which forms the magnetic shunt and through which flux $\Phi_N$ passes.

In magnet core (12), the flux $\Phi_1$ introduced by primary armature (22a) is split into fluxes $\Phi_2$ and $\Phi_N$ at branch point (26), where a first common magnetic path with unattenuated flux $\Phi_1$ is followed in magnet core (12) by a second magnetic path comprising part of the magnetic main path (19) and having attenuated flux $\Phi_2$, while a third magnetic path comprising part of magnetic shunt path (20) and having shunt flux $\Phi_N$ is established in magnet core (12), in parallel with the second magnetic path.

The flux $\Phi_N$ that is active in shunt path (20) represents, in accordance with the present invention, the desired cause of the aforesaid switching threshold increase $\Delta I$ necessary for switching secondary armature (23a). To obtain a switching threshold increase $\Delta I$, which is usually predetermined in the valve design of valve-modulator device (7), the shunt-path flux $\Phi_N$ together with the flux $\Phi_1$ can therefore be established by primary armature (22a) by defining the magnetic resistances involved.

Figure 15A:
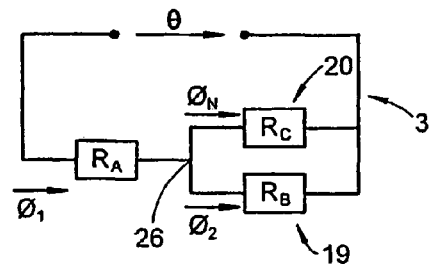
FIGS. 15a-d are circuit diagrams illustrating the magnetic flux loop under various operational states of the embodiment of the valve-modulator device depicted in FIG. 10.

FIG. 15a shows the equivalent circuit diagram of magnetic flux loop (3) with main and shunt paths (19, 20) according to FIG. 11, with the magnetic-flux-generating magnetomotive force $\theta$, the magnetic fluxes $\Phi_1$, $\Phi_2$ and $\Phi_N$, and with what, for the time being, are generally assumed magnetic resistances $R_A$, $R_B$ and $R_C$.

The fluxes can be determined by application of Kirchhoff's rules to the equivalent circuit diagram according to FIG. 15a The unattenuated flux $\Phi_1$ through primary armature (22a) is given by:

$$\Phi_1 = \frac{\Theta}{R_A + \frac{R_B \cdot R_C}{R_B + R_C}} \quad (2)$$

The attenuated flux $\Phi_2$ through secondary armature (23a) is given by:

$$\Phi_2 = \frac{\Theta}{\frac{R_A}{R_C} \cdot (R_B + R_C) + R_B} \quad (3)$$

The shunt flux $\Phi_N$ is given by:

$$\Phi_N = \frac{\Theta}{\frac{R_A}{R_B} \cdot (R_B + R_C) + R_C} \quad (4)$$

Figure 15B:
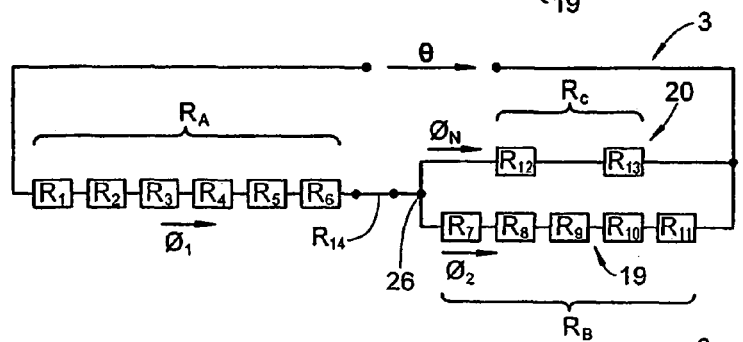
Figure 15C:
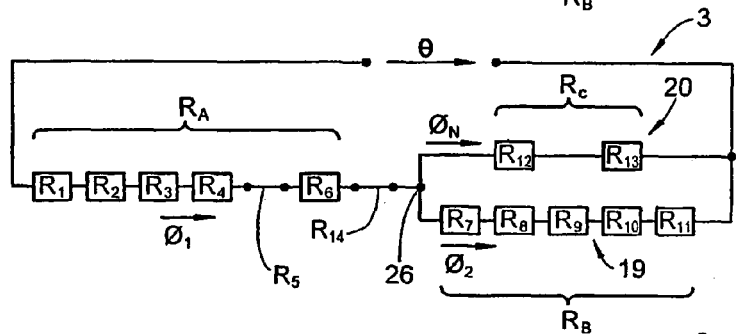

As shown in FIG. 15b, the magnetic resistances $R_A$, $R_B$, $R_C$ represent series connections of magnetic resistances of individual mechanical devices according to FIG. 11 By suitable dimensioning of these devices it is possible, according to equations [2] and [3], to establish the magnetic fluxes $\Phi_1$ and $\Phi_N$ necessary for the desired current $I_1$ for switching primary armature (22a) and for the switching threshold increase $\Delta I$ for switching secondary armature (23a).

According to FIG. 15b, the magnetic resistance $R_A$ then represents the series connection of the magnetic resistances of the following mechanical devices according to FIG. 11 in the common magnetic path through which the flux $\Phi_1$ is passing:

$R_1$ (R1) magnetic resistance of U-shaped magnet yoke (14);
$R_2$ (R2) magnetic resistance of yoke bush (15) provided for primary armature (22a);
$R_3$ (R3) magnetic resistance of nonmagnetic armature-guide tube (22r) for primary armature (22a) and of the air gap to primary armature (22a);
$R_4$ (R4) magnetic resistance of primary armature (22a);
$R_5$ (R5) magnetic resistance of the air gap between primary armature (22a) and its metal-to-metal sealing seat on magnet core (12);
$R_6$ (R6) magnetic resistance of the first common magnetic path in magnet core (12) without field attenuation by magnetic shunt path (20).

Furthermore, the magnetic resistance $R_B$ represents the series connection of the magnetic resistances of the following mechanical devices in magnetic main path (19) according to FIG. 11:

$R_7$ (R7) magnetic resistance of the second magnetic path in magnet core (12), which resistance is attenuated by magnetic shunt path (20);
$R_8$ (R8) magnetic resistance of the air gap between secondary armature (23a) and its metal-to-metal sealing seat on magnet core (12);
$R_9$ (R9) magnetic resistance of secondary armature (23a);
$R_{10}$ (R10) magnetic resistance of the air gap to secondary armature (23a) and of nonmagnetic armature-guide tube (23r) for secondary armature (23a);
$R_{11}$ (R11) magnetic resistance of yoke bush (16) provided for secondary armature (23a) along the magnetic path of the bush in radial direction.

Finally, the magnetic resistance $R_C$ represents the series connection of the magnetic resistances of the following mechanical devices in magnetic shunt path (20) according to FIG. 11:

$R_{12}$ (R12) magnetic resistance of the third magnetic path in magnet core (12) for field attenuation by magnetic shunt path (20);
$R_{13}$ (R13) magnetic resistance of yoke bush (16) provided for secondary armature (23a) along the magnetic path of the bush in axial direction, as part of magnetic shunt path (20).

Resistances $R_1$ to $R_{13}$ explained on the basis of FIG. 15 are valid for the condition illustrated in FIG. 11, in which primary armature (22a) and secondary armature (23a) are, respectively, in their normal positions determined by spring loading. When magnet current I increases from zero, the flux $\Phi_1$ in primary armature (22a) increases in accordance with these resistances until it reaches current $I_1$, whereupon primary armature (22a) switches and bears with its end face directed toward magnet core (12) to form a metal-to-metal seal therewith.

At this instant (see FIG. 15c), the magnetic air-gap resistance (R5) drops practically to zero, and this is associated with a considerable increase of the flux $\Phi_1$. To prevent secondary armature (23a) from also switching as soon as the magnet current $I_1$ is reached, a part $\Phi_N$ of this increased flux $\Phi_1$ is branched off via magnetic shunt path (20), so that the flux $\Phi_2$ remaining in main path (19) is not yet sufficient to also switch secondary armature (23a). By means of magnetic shunt path (20), therefore, the magnetic properties of secondary armature (23a) are reduced compared with primary armature (22a) in a very specific manner defined by the division of magnetic flux between resistances $R_B$ and $R_C$.

Figure 15D:
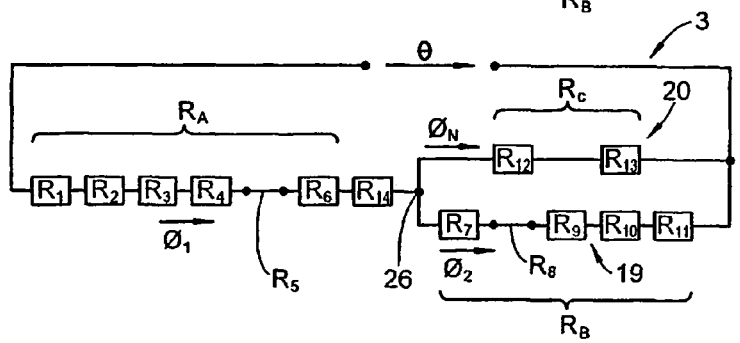

It is only when the magnet current I is increased above the first magnet current $I_1$ by the value $\Delta I$, so that it reaches the second magnet current with defined magnitude $I_2$, that the flux $\Phi_2$ through secondary armature (23a) is increased to the point that secondary armature (23a) also changes over to its switched condition (see FIG. 15d).

During switching of secondary armature (23a), the magnetic air-gap resistance (R8) drops practically to zero, and, without further measures, the flux $\Phi_2$ in secondary armature (23a) would jump abruptly, with the consequence that, to switch secondary armature (23a) back to its normal condition, such a large decrease of the magnet current would be necessary that it would also cause primary armature (22a) to switch back, and thus independent actuation of primary and secondary armatures (22a, 23a) would no longer be assured.

Such a flux increase during switching of secondary armature (23a) is prevented by nonmagnetic disk (25) with its magnetic resistance $R_{14}$, which is disposed in series with the resistance $R_6$ (see FIG. 15d).

However, this resistance is active only when secondary armature (23a) is switched, since when secondary armature (23a) is not switched the lines of force in the air gap between secondary armature (23a) and magnet core (12) are concentrated at the ferromagnetic surfaces of these units, so that nonmagnetic disk (25) is affected only by a negligible stray flux. The magnetic resistance $R_{14}$ (R14) of nonmagnetic disk (25) is therefore negligibly small when secondary armature (23a) is not switched For this case, it will be set equal to zero and not considered further.

When the magnetic resistance $R_8$ of the air gap between secondary armature (23a) and magnet core (12) itself drops to zero during switching of secondary armature (23a), however, the conditions are changed: while secondary armature (23a) is bearing on magnet core (12), only one part of the secondary armature (23a) is in contact with magnet core (12) via direct iron-to-iron contact with good field transfer, whereas the other part of secondary armature (23a) is in contact with magnet core (12) indirectly via the end face of nonmagnetic disk (25). In the equivalent circuit diagram according to FIG. 15d, the magnetic resistance $R_{14}$ of nonmagnetic disk (25) is now active as a series resistance between resistances R6 and R7, whereupon the total resistance of magnetic-flux loop (3) is artificially increased, thus preventing a sudden increase of the flux $\Phi_2$ through secondary armature (23a).

Figure 16:
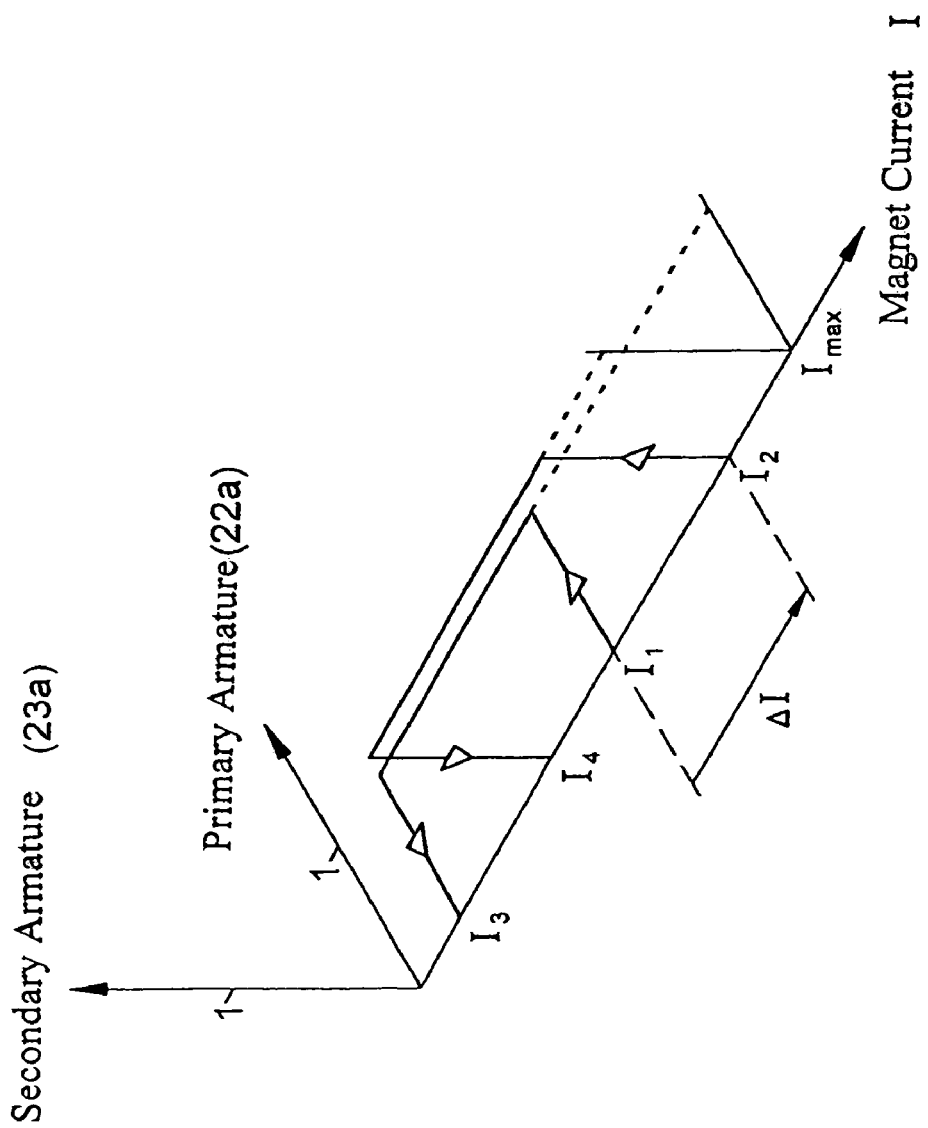
FIG. 16 is a graphical representation of the switching of the air-admission and vent valve of an embodiment of the valve-modulator device as a function of the magnet current flowing through the solenoid in accordance with the present invention.

The switching of primary armature (22a) and secondary armature (23a) as a function of the magnet current I is illustrated in FIG. 16. As explained, primary armature (22a) switches when the magnet current I reaches at least the first magnet current $I_1$, and it changes over to its normal condition when the magnet current has dropped to at least a third magnet current $I_3$. In contrast, secondary armature (23a) switches at a magnet current of at least the second magnet current $I_2$ and it returns to its normal condition when the magnet current drops to at least a fourth magnet current $I_4$. As shown, the fourth magnet current $I_4$ is much larger than the third magnet current $I_3$, and so the switching ranges for primary and secondary armatures (22a, 23a) are substantially separate from one another. The sharpness of separation for actuation of the two armatures is achieved according to the present invention by the two measures explained above: the magnetic shunt path is controlling for the "retarded" forward switching of the secondary armature ($I_2 > I_1$), and the nonmagnetic disk is controlling for the "advanced" backward switching of the secondary armature ($I_4 > I_3$). It is possible under certain circumstances to make the magnetic shunt flux so high that advanced backward switching of secondary armature (23a) is also achieved, in which case there is no need to incorporate nonmagnetic disk (25).

Figure 12:
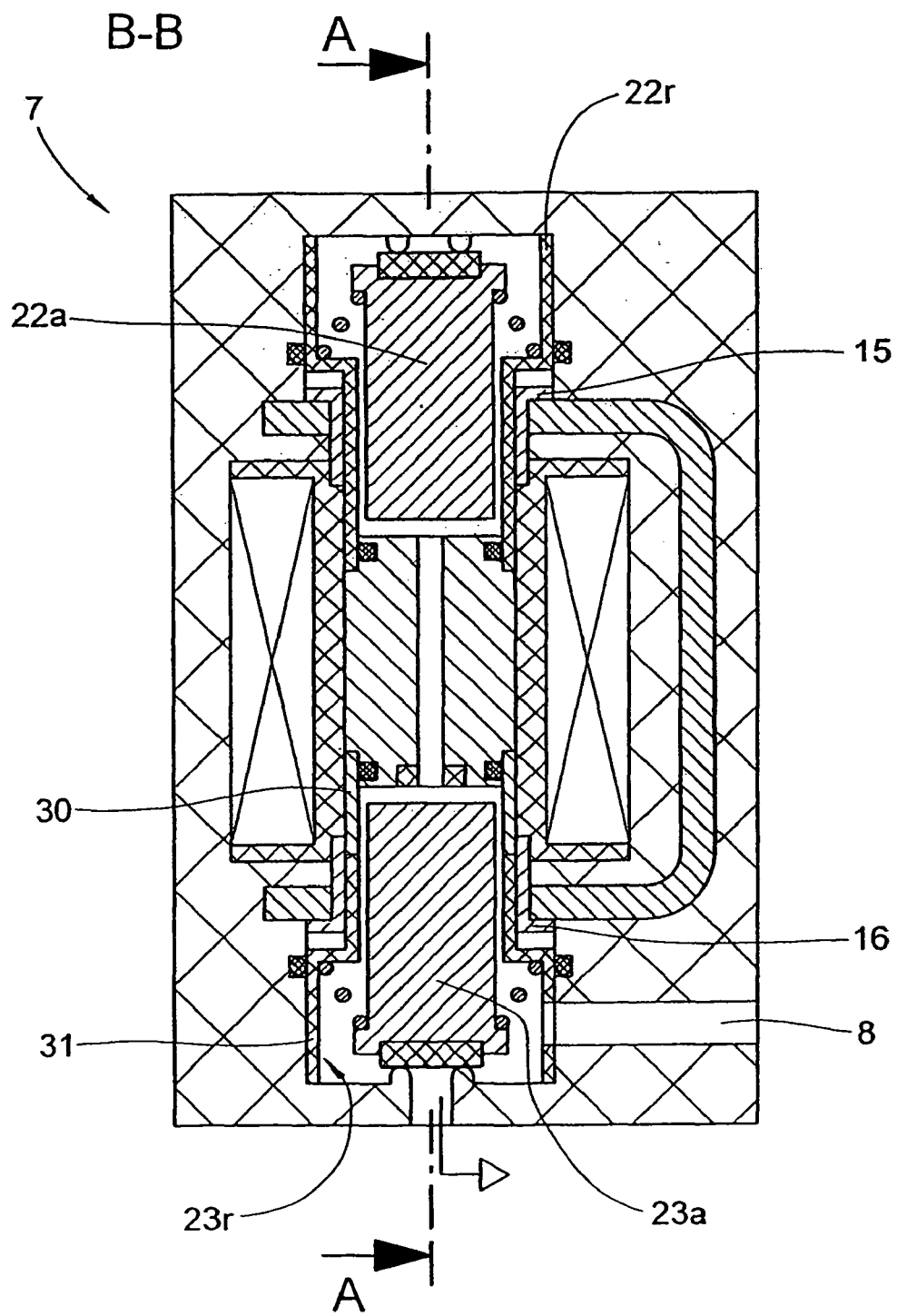
FIG. 12 is an individual sectional diagram of an alternative embodiment of the valve-modulator device in accordance with the present invention taken along line B-B in FIG. 9.
Figure 13:
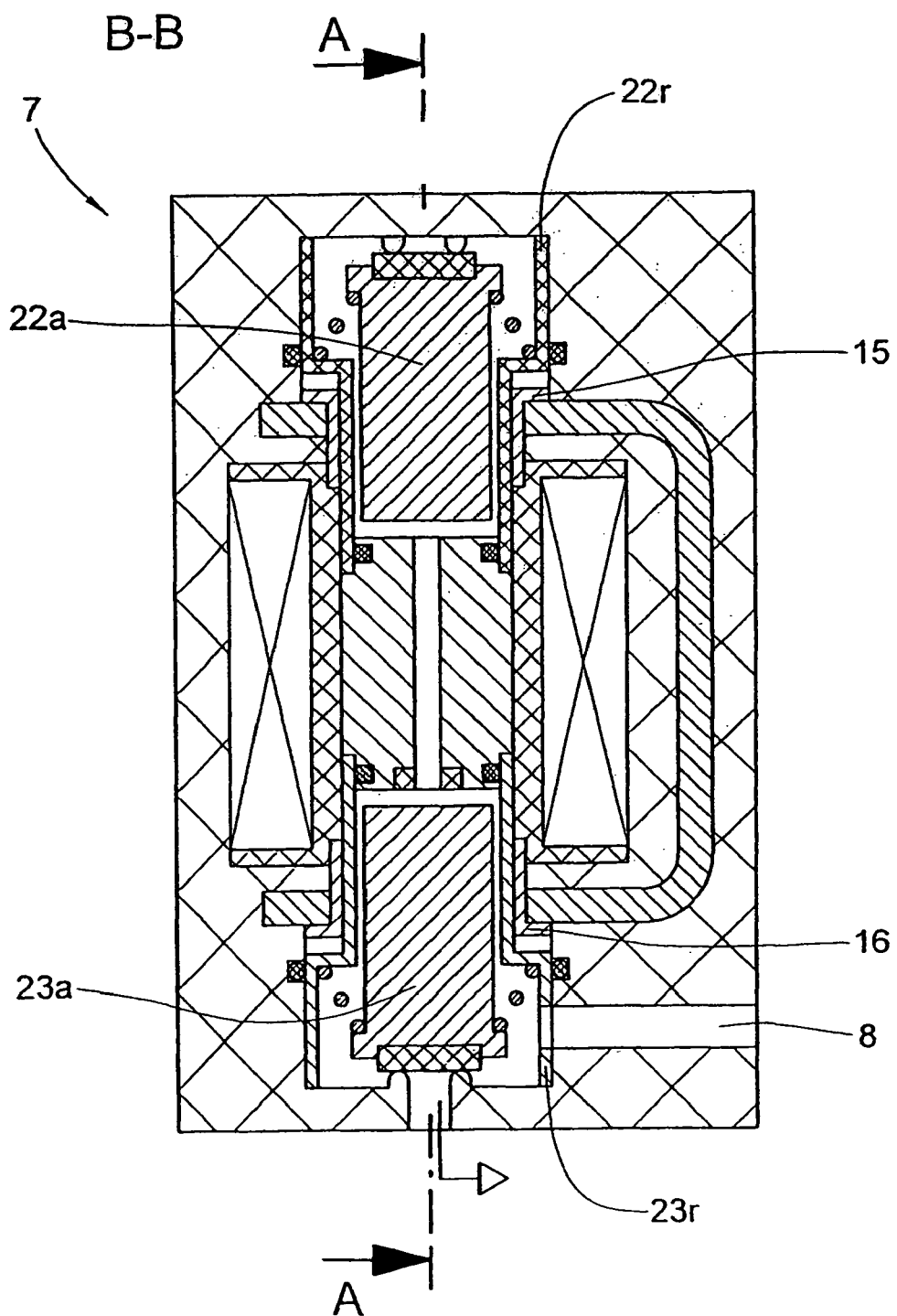
FIG. 13 is an individual sectional diagram of another alternative embodiment of the valve-modulator device in accordance with the present invention taken along line B-B in FIG. 9.
Figure 14:
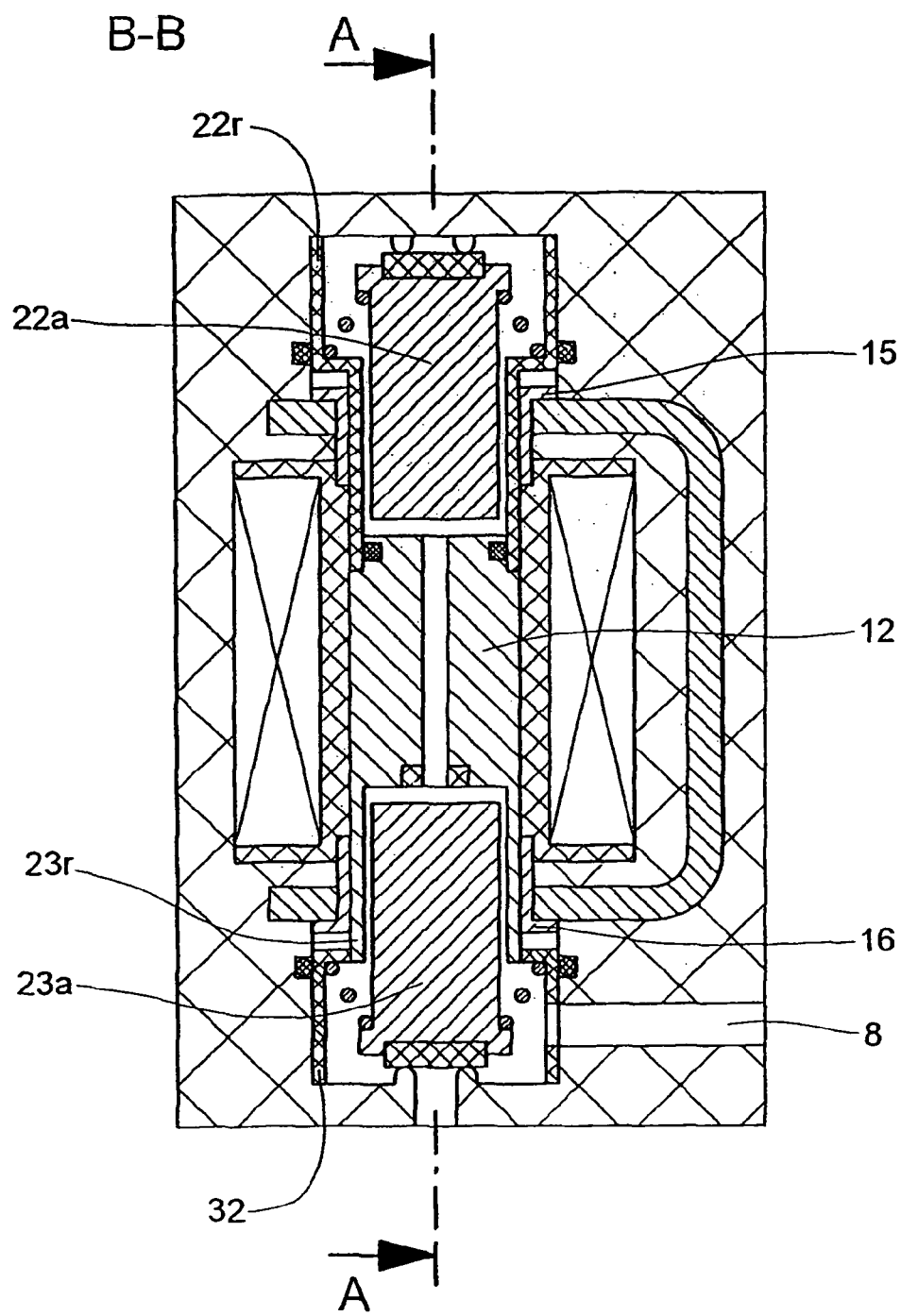
FIG. 14 is an individual sectional diagram of a further alternative embodiment of the valve-modulator device in accordance with the present invention taken along line B-B in FIG. 9.

In the further embodiments of a magnetic shunt for secondary armature (23a) depicted in FIGS. 12 to 14, the shunt is generated not by changing yoke bush (16) for secondary armature (23a), but by changing armature-guide tube (23r) itself. In these configurations, therefore, yoke bush (16) for secondary armature (23a) is made such that it is identical to the "normal" construction (15 and 28-2).

In the embodiment depicted in FIG. 12, the armature-guide tube is made partly of ferromagnetic material in order to establish the magnetic shunt for secondary armature (23a). It is composed of a first ferromagnetic part (30) and a second nonmagnetic part (31), and the one-piece armature-guide tube (23r) is formed from the first and second parts.

In the embodiment depicted in FIG. 13, armature-guide tube (23r) for secondary armature (23a) is made completely of ferromagnetic material.

Finally, in the embodiment depicted in FIG. 14, the actual armature-guide tube (23r) for secondary armature (23a) is formed as a hollow-cylindrical extension of magnet core (12) disposed immovably between primary armature (22a) and secondary armature (23a). Spring-holder attachment (32), which is made of nonmagnetic material and joined to armature-guide tube (23r), alternatively can also be made of magnetic material.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A pneumatic valve control device, comprising:
a 3/2 solenoid valve having two inputs and one output, said output being in pneumatic communication with a first valve-modulator device for a first pressure-regulating loop and with a second valve-modulator device for a second pressure-regulating loop, each of said first and second valve-modulator devices including a first normally open 2/2 solenoid air-admission valve and a second normally closed 2/2 solenoid vent valve, said first 2/2 solenoid valve including a primary armature and said second 2/2 solenoid valve including a secondary armature, said primary and secondary armatures being (i) spring-loaded, (ii) disposed in a common armature-guide arrangement and (iii) actuatable by a common solenoid, at least said secondary armature including an elastomeric insert, both said primary armature and said secondary armature being in their respective normal positions defined by spring loading when said common solenoid is de-energized, said primary armature being displaceable into switched position based on magnetic force and said secondary armature remaining in spring-loaded normal condition when a first magnet current flows through said common solenoid, both said primary armature and said secondary armature being displaceable into switched position based on said magnetic force when a second magnet current of greater magnitude than said first magnet current flows through said common solenoid, and said primary armature and said secondary armature being disposed in a common magnetic flux loop in which magnetic flux is generated by magnet current flowing through said common solenoid and in which said magnetic flux in said secondary armature is reduced compared with said magnetic flux in said primary armature.

2. The valve control device according to claim 1, wherein said secondary armature is displaceable into spring-loaded normal position when a third magnet current of lesser magnitude than said second magnet current flows through said common solenoid, said primary armature remaining in switched position based on said magnetic force.

3. The valve control device according to claim 1, wherein both said primary armature and said secondary armature are of the same construction and include an elastomeric insert.

4. The valve control device according to claim 1, wherein said 3/2 solenoid valve is operable as a redundancy valve, one of said two inputs of said 3/2 solenoid valve being adapted to receive application of a supply pressure and the other one of said two inputs of said 3/2 solenoid valve being adapted to receive application of a redundancy pressure.

5. The valve control device according to claim 1, further comprising a magnetic shunt connected in parallel to said secondary armature, said shunt adapted to effect a reduction of said magnetic flux in said secondary armature.

6. The valve control device according to claim 1, further comprising magnetic-field-concentrating yoke bushes of ferromagnetic material on said common armature-guide arrangement of said valve-modulator device in a region of said primary armature and of said secondary armature, one of said yoke bushes being associated with said secondary armature and provided on a secondary armature-guide tube, another of said yoke bushes being associated with said primary armature and provided on a primary armature-guide tube, said one of said yoke bushes associated with said secondary armature extending over a greater length region than that of said another of said yoke bushes associated with said primary armature.

7. The valve control device according to claim 6, wherein said secondary armature-guide tube is composed at least partly of ferromagnetic material.

8. The valve control device according to claim 6, wherein said secondary armature-guide tube is constructed as a hollow-cylindrical extension of a magnet core disposed immovably in said common armature-guide arrangement between said primary and secondary armatures.

9. The valve control device according to claim 6, further comprising a magnet core of ferromagnetic material joined immovably to said armature-guide arrangement between said region of said primary armature and of said secondary armature, and a disk of nonmagnetic material provided on an end of said magnet core directed toward said secondary armature.

* * * * *